US012364993B1

(12) United States Patent
Wang

(10) Patent No.: US 12,364,993 B1
(45) Date of Patent: Jul. 22, 2025

(54) SPRAY GUN CONFIGURED FOR SWITCHING BETWEEN SPRAY MODES OF THE SPRAY GUN

(71) Applicants: Kangkang Tong, Zhejiang (CN); Huafeng Luo, Zhejiang (CN)

(72) Inventor: Meijiazhi Wang, Zhejiang (CN)

(73) Assignees: Kangkang Tong, Zhejiang (CN); Huafeng Luo, Zhejiang (CN)

( * ) Notice: Subject to any disclaimer, the term of this patent is extended or adjusted under 35 U.S.C. 154(b) by 0 days.

(21) Appl. No.: 19/024,222

(22) Filed: Jan. 16, 2025

(30) Foreign Application Priority Data

Oct. 12, 2024 (CN) ......................... 202422463583.3

(51) Int. Cl.
*B05B 1/12* (2006.01)
*B05B 12/00* (2018.01)

(52) U.S. Cl.
CPC ............ *B05B 1/12* (2013.01); *B05B 12/0022* (2018.08)

(58) Field of Classification Search
CPC ........... B05B 1/12; B05B 1/16; B05B 1/1627; B05B 1/1636; B05B 12/002; B05B 12/0022; B05B 15/63
USPC .......................................... 239/525, 526, 532
See application file for complete search history.

(56) References Cited

U.S. PATENT DOCUMENTS

| | | | | |
|---|---|---|---|---|
| 6,981,661 | B1 * | 1/2006 | Chen | B05B 1/1636 239/447 |
| 7,156,325 | B1 * | 1/2007 | Chen | B05B 1/1636 239/394 |
| 2006/0016913 | A1 * | 1/2006 | Lo | B05B 1/1636 239/525 |
| 2014/0054399 | A1 * | 2/2014 | Hsieh | F16K 5/0442 239/526 |
| 2015/0343467 | A1 * | 12/2015 | Chen | B05B 9/01 239/526 |
| 2017/0203308 | A1 * | 7/2017 | Huang | B05B 1/12 |
| 2019/0299223 | A1 * | 10/2019 | Yu | B05B 9/01 |

* cited by examiner

*Primary Examiner* — Darren W Gorman
(74) *Attorney, Agent, or Firm* — ScienBiziP, P.C.

(57) ABSTRACT

The present disclosure discloses a spray gun configured for switching between spray modes of the spray gun, which includes: a water inlet pipe, a regulating four-way valve with a regulating core, a movable handle, a gun rod, and a nozzle assembly, wherein the regulating core is arranged in an inner cavity of the regulating four-way valve, the water inlet pipe is arranged at one end of the regulating four-way valve, and one end of the gun rod is arranged at another end of the regulating four-way valve; the nozzle assembly is arranged at another end of the gun rod; the movable handle is connected to two ends of the regulating core; and the nozzle assembly includes a nozzle seat, a nozzle sheath and a linear nozzle, and the nozzle seat includes a linear nozzle seat and a porous nozzle seat.

8 Claims, 4 Drawing Sheets

SPRAY GUN CONFIGURED FOR SWITCHING BETWEEN SPRAY MODES OF THE SPRAY GUN

CROSS-REFERENCE TO RELATED APPLICATION

This application claims the priority of Chinese Application No. 202422463583.3, filed on Oct. 12, 2024, the disclosure of which is incorporated in its entirety by reference herein.

TECHNICAL FIELD

The present disclosure relates to the technical field of water spraying tools, and in particular, to a spray gun configured for switching between spray modes of the spray gun.

BACKGROUND

A spray gun, as a widely used water spraying tool, is often used to flush toilets, floors, glass doors, wash basins and the like, and also used for watering gardens or farms. A spray gun generally has different spray modes for different usage environments to switch between a linear water spray mode and a mist water spray mode according to the use requirements of a user.

However, in the prior art, most spray guns use switching nozzles to switch the spray modes. Such a nozzle has a complex structure, high manufacturing process requirements and high cost. In addition, frequent rotation switching accelerates the wear of components and affects the sealing effect.

SUMMARY

The present disclosure provides a spray gun configured for switching between spray modes of the spray gun, which can avoid wear of components caused by frequent switching of the spray modes.

The present disclosure is characterized as follows.

A spray gun configured for switching between spray modes of the spray gun includes a water inlet pipe; a regulating four-way valve including a regulating core; a movable handle; a gun rod; a water inlet adapter; and a nozzle assembly; wherein the regulating core is arranged in an inner cavity of the regulating four-way valve, the water inlet pipe is arranged at one end of the regulating four-way valve, and one end of the gun rod is arranged at another end of the regulating four-way valve; the water inlet adapter is arranged between the water inlet pipe and the regulating four-way valve; the nozzle assembly is arranged at another end of the gun rod; the movable handle is connected to two ends of the regulating core;

the nozzle assembly includes a nozzle seat, a nozzle sheath and a linear nozzle, the nozzle seat includes a linear nozzle seat and a porous nozzle seat, the linear nozzle seat is arranged at one end of an inner cavity of the porous nozzle seat, and another end of the porous nozzle seat away from the linear nozzle seat is provided with a fluid diverting part; the linear nozzle is arranged at a center of the linear nozzle seat;

the nozzle assembly further includes a plurality of scattering holes uniformly distributed on the fluid diverting part, and a center of a circle of the plurality of scattering holes is provided with a water passing mounting hole;

the gun rod includes an outer gun rod and an inner gun rod, the inner gun rod is arranged in an inner cavity of the outer gun rod, one end of the inner gun rod is arranged in the water passing mounting hole, and another end of the inner gun rod is arranged on one side of the regulating core; the fluid diverting part is arranged between the inner gun rod and the outer gun rod; and one end of the outer gun rod is connected to the regulating four-way valve, and another end of the outer gun rod is connected to the nozzle assembly.

Preferably, the regulating core is provided with a first water passing hole and a second water passing hole, the first water passing hole and the second water passing hole adjacent to each other in parallel, and the first water passing hole and the second water passing hole are arranged at an angle.

Preferably, the movable handle includes a limit platform, and an angle between each of two sides of the limit platform and the regulating four-way valve is the same as the angle between the first water passing hole and the second water passing hole.

Preferably, a diameter of each of the plurality of scattering holes is not more than 2.5 mm, and each of the plurality of scattering holes extends to an end surface of the fluid diverting part at an angle of 60°.

Preferably, the nozzle sheath is arranged outside of the nozzle seat, and the nozzle assembly further includes a water outlet adapter arranged between the nozzle sheath and the nozzle seat.

Preferably, the water inlet pipe is provided with a water inlet sheath, and the water inlet sheath includes no less than 5 reinforcing ribs.

Preferably, the nozzle assembly further includes a sealing element arranged between each two of the water outlet adapter, the porous nozzle seat and the linear nozzle seat.

Preferably, one end of the regulating core is provided with a limit boss, and a shape of the limit boss is a polygon.

According to the technical solution, the regulating core is arranged in the inner cavity of the regulating four-way valve, and the movable handle is connected to two ends of the regulating core, so that the user can switch between the inner gun rod and the outer gun rod by the movable handle and the regulating core connected to the movable handle, thereby achieving free, easy and quick switching of the spray modes.

Figure 1:
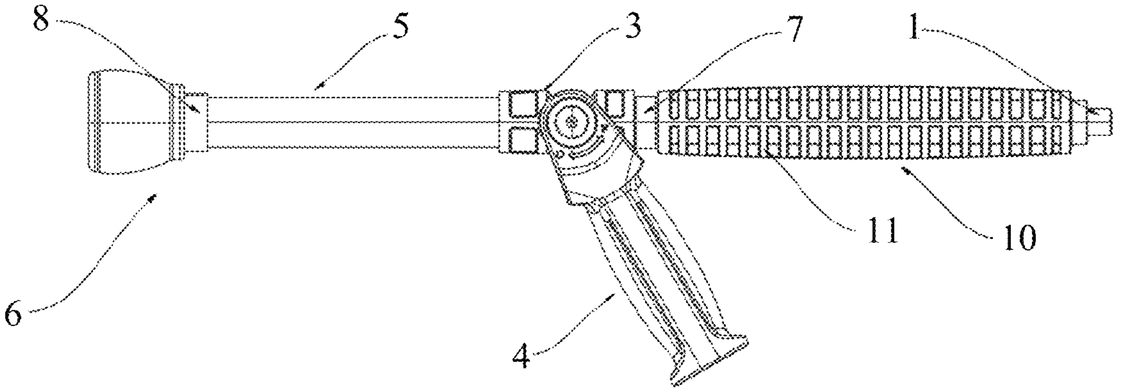
FIG. 1 is a main view of an embodiment of a spray gun according to the present disclosure.

In the drawings, 1: water inlet pipe, 2: regulating core, 3: regulating four-way valve, 4: movable handle, 5: gun rod, 6: nozzle assembly, 7: water inlet adapter, 8: water outlet adapter, 9: limit platform, 10: water inlet sheath, 11: reinforcing rib, 12: sealing element, 13: limit boss, 201: first water passing hole, 202: second water passing hole, 501: outer gun rod, 502: inner gun rod, 601: nozzle seat, 602: nozzle sheath, 603: linear nozzle, 604: linear nozzle seat, 605: porous nozzle seat, 606: fluid diverting part, 607: scattering hole, and 608: water passing mounting hole.

DETAILED DESCRIPTION OF EMBODIMENTS

The following further describes specific embodiments of the present disclosure with reference to the accompanying drawings. It should be noted that the description of these embodiments is used to help understand the present disclosure, but does not constitute a limitation of the present disclosure. In addition, the technical features involved in the various embodiments of the present disclosure described below can be combined with each other as long as these technical features do not conflict with each other.

Figure 2:
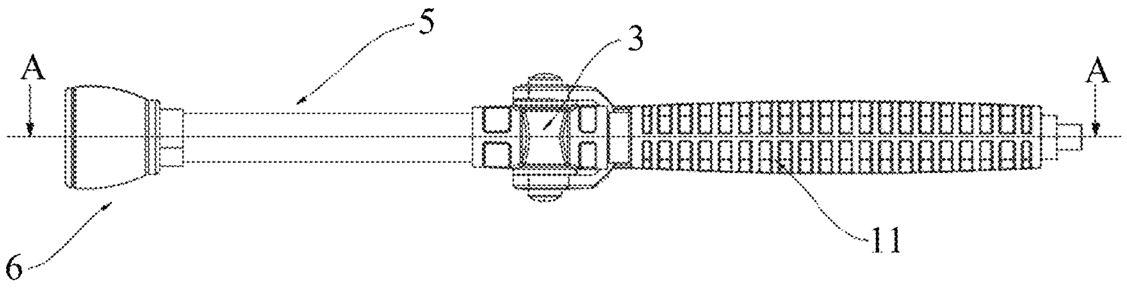
FIG. 2 is a top view of the spray gun shown in FIG. 1.
Figure 3:
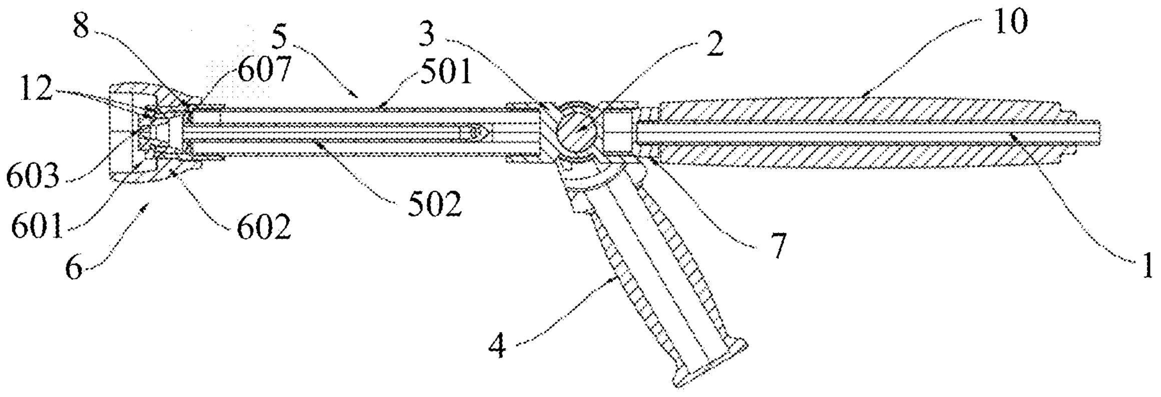
FIG. 3 is a cross-sectional view of the spray gun viewed along A-A in FIG. 2.
Figure 4:
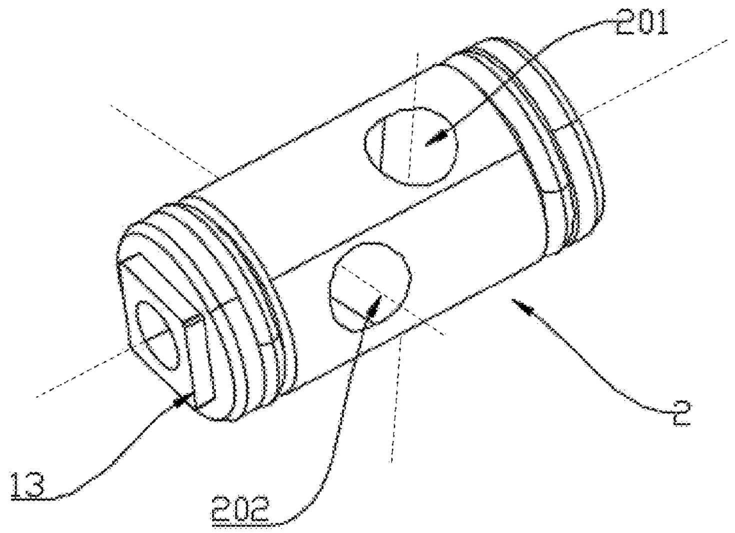
FIG. 4 is a schematic diagram of an embodiment of a structure of a regulating core according to the present disclosure.
Figure 5:
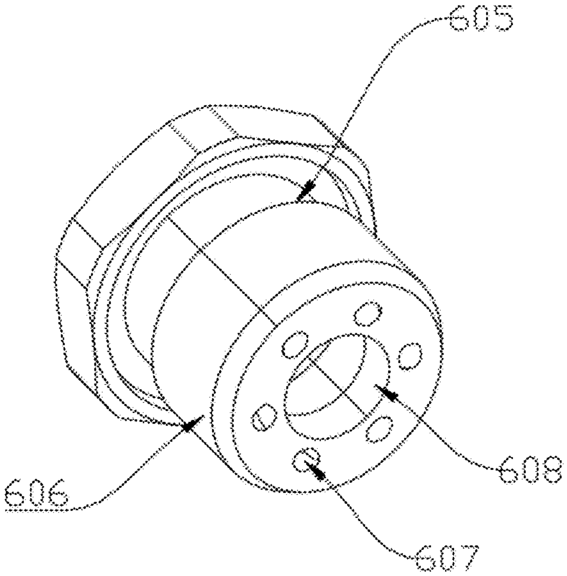
FIG. 5 is a schematic diagram of an embodiment of a structure of a porous nozzle seat according to the present disclosure.
Figure 6:
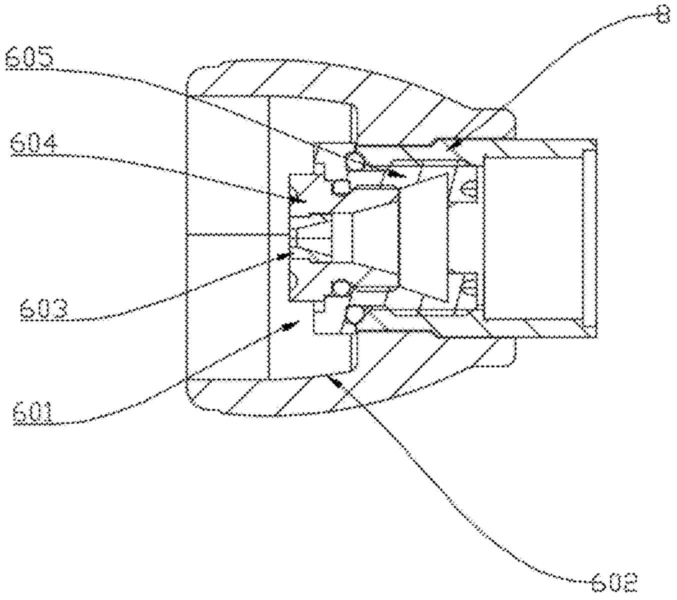
FIG. 6 is a cross-sectional view of an embodiment of a nozzle assembly according to the present disclosure.
Figure 7:
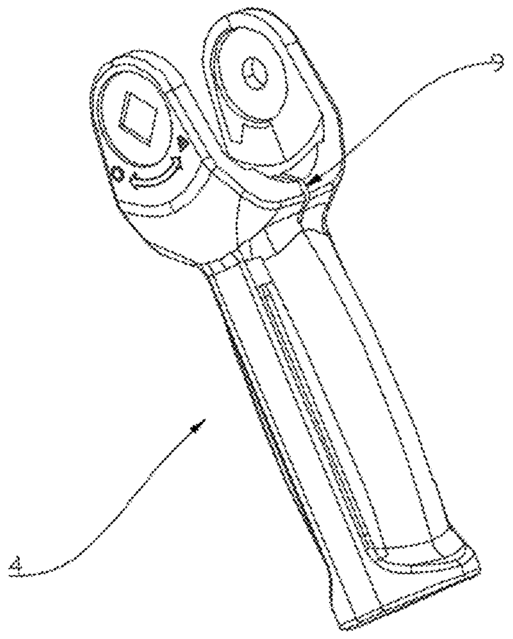
FIG. 7 is a schematic diagram of an embodiment of a structure of a movable handle according to the present disclosure.

As shown in FIGS. 1-7, a a spray gun configured for switching between spray modes of the spray gun includes a water inlet pipe 1; a regulating four-way valve 3 including a regulating core 2; a movable handle 4; a gun rod 5; a water inlet adapter 7; and a nozzle assembly 6; wherein the regulating core 2 is arranged in an inner cavity of the regulating four-way valve 3, the water inlet pipe 1 is arranged at one end of the regulating four-way valve 3, and one end of the gun rod 5 is arranged at another end of the regulating four-way valve 3; the water inlet adapter 7 is arranged between the water inlet pipe 1 and the regulating four-way valve 3; the nozzle assembly 6 is arranged at another end of the gun rod 5; the movable handle 4 is connected to two ends of the regulating core 2;

the nozzle assembly 6 includes a nozzle seat 601, a nozzle sheath 602 and a linear nozzle 603, the nozzle seat 601 includes a linear nozzle seat 604 and a porous nozzle seat 605, the linear nozzle seat 604 is arranged at one end of an inner cavity of the porous nozzle seat 605, and another end of the porous nozzle seat 605 away from the linear nozzle seat is provided with a fluid diverting part 606; the linear nozzle 603 is arranged at a center of the linear nozzle seat 604;

the nozzle assembly 6 further includes a plurality of scattering holes 607 uniformly distributed on the fluid diverting part 606, and a center of a circle of each of the plurality of scattering holes 607 is provided with a water passing mounting hole 608; the gun rod 5 includes an outer gun rod 501 and an inner gun rod 502, the inner gun rod 502 is arranged in an inner cavity of the outer gun rod 501, one end of the inner gun rod 502 is arranged in the water passing mounting hole 608, and another end of the inner gun rod is arranged on one side of the regulating core 2; the scattering holes 607 is arranged between the inner gun rod 502 and the outer gun rod 501; and one end of the outer gun rod 501 is connected to the regulating four-way valve 3, and another end of the outer gun rod is connected to the nozzle assembly 6. Therefore, a user can switch between the inner gun rod 502 and the outer gun rod 501 by the movable handle 4 and the regulating core 2 connected to the movable handle 4, thereby achieving free, easy and quick switching of the spray modes.

In addition, the regulating core 2 is provided with a first water passing hole 201 and a second water passing hole 202, the first water passing hole 201 and the second water passing hole 202 are adjacent to each other in parallel, and the first water passing hole 201 and the second water passing hole 202 are arranged at an angle to facilitate the switching of the spray modes.

Further, the movable handle 4 includes a limit platform 9, and an angle between each of two sides of the limit platform 9 and the regulating four-way valve 3 is the same as the angle between the first water passing hole 201 and the second water passing hole 202.

In addition, a diameter of each of the plurality of scattering holes 607 is not more than 2.5 mm, and each of the plurality of scattering holes 607 extends to an end surface of the fluid diverting part 606 at an angle of 60°, thereby improving the scattering effect of water.

Further, the nozzle sheath 602 is arranged outside of the nozzle seat 601, and the nozzle assembly 6 further includes a water outlet adapter 8 arranged between the nozzle sheath 602 and the nozzle seat 601, so as to facilitate mounting and replacement of the nozzle seat 601.

In addition, the water inlet pipe 1 is provided with a water inlet sheath 10, and the water inlet sheath 10 includes no less than 5 reinforcing ribs 11. In this embodiment, 6 reinforcing ribs 11 are used to improve the overall strength of the water inlet sheath 10.

Further, the nozzle assembly 6 further includes a sealing element 12 arranged between each two of the water outlet adapter, the porous nozzle seat 605 and the linear nozzle seat 604 to improve the sealing effect of the spray gun.

In addition, one end of the regulating core 2 is provided with a limit boss 13, and a shape of the limit boss 13 is a polygon, so that the movable handle 4 can stably regulate and rotate the regulating core 2 to achieve the switching of the spray modes.

The embodiments of the present disclosure are described in detail above with reference to the accompanying drawings, but the present disclosure is not limited to the described embodiments. For those skilled in the art, various changes, modifications, substitutions and variations made to these implementations without departing from the principles and spirit of the present disclosure still fall within the protection scope of the present disclosure.

The invention claimed is:

1. A spray gun configured for switching between spray modes of the spray gun, the spray gun comprising: a water inlet pipe; a regulating four-way valve comprising a regulating core; a movable handle; a gun rod; a water inlet adapter; and a nozzle assembly; wherein the regulating core is arranged in an inner cavity of the regulating four-way valve, the water inlet pipe is arranged at one end of the regulating four-way valve, and one end of the gun rod is arranged at another end of the regulating four-way valve; the water inlet adapter is arranged between the water inlet pipe and the regulating four-way valve; the nozzle assembly is arranged at another end of the gun rod; the movable handle is connected to two ends of the regulating core;

the nozzle assembly comprises a nozzle seat, a nozzle sheath and a linear nozzle, the nozzle seat comprises a linear nozzle seat and a porous nozzle seat, the linear nozzle seat is arranged at one end of an inner cavity of the porous nozzle seat, and another end of the porous nozzle seat away from the linear nozzle seat is provided with a fluid diverting part; the linear nozzle is arranged at a center of the linear nozzle seat;

the nozzle assembly further comprises a plurality of scattering holes uniformly distributed on the fluid diverting part, and a center of a circle of the plurality of scattering holes is provided with a water passing mounting hole; the gun rod comprises an outer gun rod and an inner gun rod, the inner gun rod is arranged in an inner cavity of the outer gun rod, one end of the inner gun rod is arranged in the water passing mounting hole, and another end of the inner gun rod is arranged on one side of the regulating core; the scattering holes are arranged between the inner gun rod and the outer gun rod; and one end of the outer gun rod is connected to the regulating four-way valve, and another end of the outer gun rod is connected to the nozzle assembly.

2. The spray gun according to claim 1, wherein the regulating core is provided with a first water passing hole and a second water passing hole, the first water passing hole and the second water passing hole are adjacent to each other in parallel, wherein an angle is formed between an axis of the first water passing hole and an axis of the second water passing hole when the first water passing hole and the second water passing hole are viewed along a central axis direction of the regulating core.

3. The spray gun according to claim 2, wherein the movable handle comprises a limit platform, and an angle between each of two sides of the limit platform and the regulating four-way valve is same as the angle formed between the axis of the first water passing hole and the axis of the second water passing hole when viewed along the central axis direction of the regulating core.

4. The spray gun according to claim 1, wherein a diameter of each of the plurality of scattering holes is not more than 2.5 mm, and each of the plurality of scattering holes extends to an end surface of the fluid diverting part and forms an angle of 60° relative to the end surface.

5. The spray gun according to claim 1, wherein the nozzle sheath is arranged outside of the nozzle seat, and the nozzle assembly further comprises a water outlet adapter arranged between the nozzle sheath and the nozzle seat.

6. The spray gun according to claim 1, wherein the water inlet pipe is provided with a water inlet sheath comprising no less than 5 reinforcing ribs.

7. The spray gun according to claim 5, wherein the nozzle assembly further comprises a sealing element arranged between each two of the water outlet adapter, the porous nozzle seat and the linear nozzle seat.

8. The spray gun according to claim 2, wherein one end of the regulating core is provided with a limit boss, and a shape of the limit boss is a polygon.

* * * * *